(12) United States Patent
Sundaresh et al.

(10) Patent No.: US 10,503,491 B2
(45) Date of Patent: Dec. 10, 2019

(54) ON-PROCESS MIGRATION OF NON-REDUNDANT INPUT/OUTPUT (I/O) FIRMWARE

(71) Applicant: Honeywell International Inc., Morris Plains, NJ (US)

(72) Inventors: Nagaraja Sundaresh, Telangana (IN); Michael D. Carney, Havertown, PA (US); Shripad Pande, Telangana (IN); Shankar Pendyala, Telangana (IN); Meraj Jabri, Telangana (IN)

(73) Assignee: Honeywell International Inc., Morris Plains, NJ (US)

( * ) Notice: Subject to any disclaimer, the term of this patent is extended or adjusted under 35 U.S.C. 154(b) by 153 days.

(21) Appl. No.: 15/268,486

(22) Filed: Sep. 16, 2016

(65) Prior Publication Data

US 2018/0081675 A1 Mar. 22, 2018

(51) Int. Cl.
| G06F 9/44 | (2018.01) |
| G06F 8/656 | (2018.01) |
| G06F 9/4401 | (2018.01) |
| G06F 8/654 | (2018.01) |

(52) U.S. Cl.
CPC .............. *G06F 8/656* (2018.02); *G06F 8/654* (2018.02); *G06F 9/4406* (2013.01); *G06F 9/4416* (2013.01)

(58) Field of Classification Search
None
See application file for complete search history.

(56) References Cited

U.S. PATENT DOCUMENTS

| 6,557,101 B1 * | 4/2003 | MacDonald ............ H04L 12/56 710/302 |
| 6,865,644 B2 | 3/2005 | Husted et al. |
| 8,072,098 B2 | 12/2011 | Elias et al. |
| 8,108,853 B2 | 1/2012 | Bale et al. |
| 8,392,626 B2 | 3/2013 | Wormmeester et al. |
| 8,656,065 B1 | 2/2014 | Gerhart et al. |

(Continued)

FOREIGN PATENT DOCUMENTS

JP 2008033709 A 2/2008

OTHER PUBLICATIONS

International Search Report and Written Opinion of the International Searching Authority for PCT Patent Application No. PCT/US2017/051097 dated Dec. 22, 2017, 14 pages.

(Continued)

*Primary Examiner* — Kim Huynh
*Assistant Examiner* — Danny Chan

(57) ABSTRACT

A method includes receiving, at a first processing device of an input/output module (IOM), new firmware data for the IOM. The method also includes sending an output hold command from the first processing device to a second processing device of the IOM. The method further includes upgrading firmware of the IOM with the new firmware data using the first processing device and attempting a reboot of the first processing device. In addition, the method includes, in response to the output hold command and during the upgrading of the firmware and the rebooting of the first processing device, using the second processing device to cause a field circuit of the IOM to hold at least one previous output signal for one or more external devices.

21 Claims, 5 Drawing Sheets

(56) References Cited

U.S. PATENT DOCUMENTS

| | | | |
|---|---|---|---|
| 8,782,633 | B1 | 7/2014 | Tamilarasan et al. |
| 8,924,498 | B2 | 12/2014 | McLaughlin |
| 9,699,022 | B2 | 7/2017 | Bale et al. |
| 2003/0163640 | A1 | 8/2003 | Pruett et al. |
| 2009/0019146 | A1* | 1/2009 | Tegnell ............. H04L 12/40032 709/224 |
| 2009/0210561 | A1 | 8/2009 | Ricci et al. |
| 2009/0210607 | A1* | 8/2009 | Hanscom ............ G06F 11/0745 710/315 |
| 2010/0191869 | A1* | 7/2010 | Kase ................... G06F 11/2017 710/10 |
| 2011/0191500 | A1* | 8/2011 | Odayappan ........ G05B 19/0426 710/8 |
| 2013/0006393 | A1* | 1/2013 | Fletcher ................... G05B 9/02 700/12 |
| 2013/0067189 | A1 | 3/2013 | Heinrich et al. |
| 2014/0064482 | A1* | 3/2014 | Sin ........................ H04L 9/0891 380/44 |
| 2015/0032904 | A1* | 1/2015 | Zhang ..................... H04L 45/58 709/238 |
| 2015/0278144 | A1 | 10/2015 | McLaughlin et al. |
| 2016/0062350 | A1 | 3/2016 | Prall et al. |
| 2016/0334775 | A1* | 11/2016 | Haerter .................... G05B 9/02 |
| 2017/0052523 | A1* | 2/2017 | Grosch ............. G05B 19/0426 |
| 2017/0185055 | A1* | 6/2017 | Nakajima ............ G05B 13/022 |

OTHER PUBLICATIONS

Mani, Prakash et al., "Method and Apparatus for an On-Process Migration in a Virtual Environment Within an Industrial Process Control and Automation System", U.S. Appl. No. 14/871,898, filed Sep. 30, 2015, 34 pages.

Sreenivasamurthy, Shreehari et al. "Method and System for Distributed Control System (DCS) Process Data Cloning and Migration Through Secured File System", U.S. Appl. No. 14/681,536, filed Apr. 8, 2015, 26 pages.

McLaughlin, Paul F. et al. "Methods for On-Process Migration From One Type of Process Control Device to Different Type of Process Control Device" U.S. Appl. No. 15/078,832, filed Mar. 23, 2016, 34 pages.

Rachlin, Elliot et al., "System and Method for Facilitating Dynamic Remapping of Absolute Addresses During Software Migration", U.S. Appl. No. 15/176,108, filed Jun. 7, 2016, 24 pages.

Allen-Bradley, Rockwell Software, Rockwell Automation User Manual, "Controlflash Firmware Upgrade Software", Catalog Numbers ControlFLASH 12.00.00, Rockwell Automation Publication 1756-UM105E-EN-E, Oct. 2012, 49 pages.

Honeywell Process Solutions Case Study, "Preparation, Data Gathering and Site Support: Holly Refining & Marketing Company—Woods Cross LLC's Migration To Experion R410", Sep. 2013, 3 pages.

Honeywell Process Solutions Product Information Note, "Experion Universal Process I/O", Nov. 2012, 2 pages.

Analog Devices, Inc., "16-Bit Fully Isolated Output Module Using the AD5422 Single Chip Voltage and Current Output DAC and the ADuM1401 Digital Isolator", 2009-2011, 3 pages, Circuit Note CN-0065, Norwood, MA, U.S.A.

maximintergrated.com, "System Board 5976 MAXREFDES63#: 8-Channel Digital Output Micro PLC Card", Dec. 8, 2014, 6 pages, http://www.maximintegrated.com/en/design/reference-design-center/system-board/5976.html.

NXP, "Industrial CAN I/O Module Reference Design", Dec. 2015, 2 pages, http://www.nxp.com/products/automotive-products/microcontrollers-and-processors/16-bit-s12-s12x-mcus/industrial-can-i-o-module-reference-design:RDHCS12CANIOMOD?fsrch=1&sr=1&pageNum=1.

* cited by examiner

ON-PROCESS MIGRATION OF NON-REDUNDANT INPUT/OUTPUT (I/O) FIRMWARE

TECHNICAL FIELD

This disclosure is generally directed to industrial process control and automation systems. More specifically, this disclosure is directed to on-process migration of non-redundant input/output (I/O) firmware.

BACKGROUND

Industrial process control and automation systems are often used to automate large and complex industrial processes. These types of control and automation systems routinely include process controllers and field devices like sensors and actuators. The process controllers typically receive measurements from the sensors and generate control signals for the actuators. In many systems, a process controller includes or is used with one or more input/output (I/O) modules, each of which can be used to provide signals to and receive signals from one or more field devices.

One popular hardware architecture for an I/O module uses a single microprocessor. During a firmware upgrade of the I/O module's microprocessor or during a reset of the I/O module's microprocessor after a firmware upgrade, the I/O module's microprocessor cannot send or receive signals. Unfortunately, this can result in a complete loss of view or control over its associated field devices. Among other problems, a non-redundant process controller that includes a single-microprocessor I/O module cannot enforce a failsafe action during a boot failure of the I/O module's microprocessor, which could occur when the microprocessor fails to boot after a firmware upgrade. As a result, part or all of an industrial process often needs to be shut down during a firmware upgrade of a process controller's I/O modules, resulting in a loss of production and the associated monetary losses. While it may be possible to incorporate multiple redundant process controllers or I/O modules in a control and automation system, this increases the complexity and cost of the overall system, and it is not always possible to have redundant process controllers or I/O modules in a system.

SUMMARY

This disclosure provides for on-process migration of non-redundant input/output (I/O) firmware.

In a first embodiment, a method includes receiving, at a first processing device of an input/output module (IOM), new firmware data for the IOM. The method also includes sending an output hold command from the first processing device to a second processing device of the IOM. The method further includes upgrading firmware of the IOM with the new firmware data using the first processing device and attempting a reboot of the first processing device. In addition, the method includes, in response to the output hold command and during the upgrading of the firmware and the rebooting of the first processing device, using the second processing device to cause a field circuit of the IOM to hold at least one previous output signal for one or more external devices.

In a second embodiment, an apparatus is configured for use with a first processing device of an IOM. The apparatus includes a second processing device configured to receive an output hold command from the first processing device. The second processing device is also configured, in response to the output hold command and during an upgrade of firmware in the IOM by the first processing device and during rebooting of the first processing device, to cause a field circuit of the IOM to hold at least one previous output signal for one or more external devices.

In a third embodiment, a system includes an IOM configured to receive one or more input signals from and/or provide one or more output signals to at least one external device. The IOM includes a first processing device, a second processing device, and a field circuit configured to receive the one or more input signals and/or provide the one or more output signals. The first processing device is configured to receive new firmware data for the IOM, send an output hold command to the second processing device, upgrade firmware of the IOM with the new firmware data, and attempt a reboot. The second processing device is configured, in response to the output hold command and during the upgrading of the firmware and the rebooting of the first processing device, to cause the field circuit to hold at least one previous output signal for the at least one external device.

In a fourth embodiment, a non-transitory computer readable medium contains instructions for use in conjunction with a first processing device of an IOM. The instructions when executed by a second processing device of the IOM are configured to cause the second processing device to receive an output hold command from the first processing device. The instructions when executed by the second processing device of the IOM are also configured to cause the second processing device, in response to the output hold command and during an upgrade of firmware in the IOM by the first processing device and during rebooting of the first processing device, to cause a field circuit of the IOM to hold at least one previous output signal for one or more external devices.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 5, discussed below, and the various examples used to describe the principles of the present invention in this patent document are by way of illustration only and should not be construed in any way to limit the scope of the invention. Those skilled in the art will understand that the principles of the present invention may be implemented in any suitable manner and in any type of suitably arranged device or system.

Figure 1:
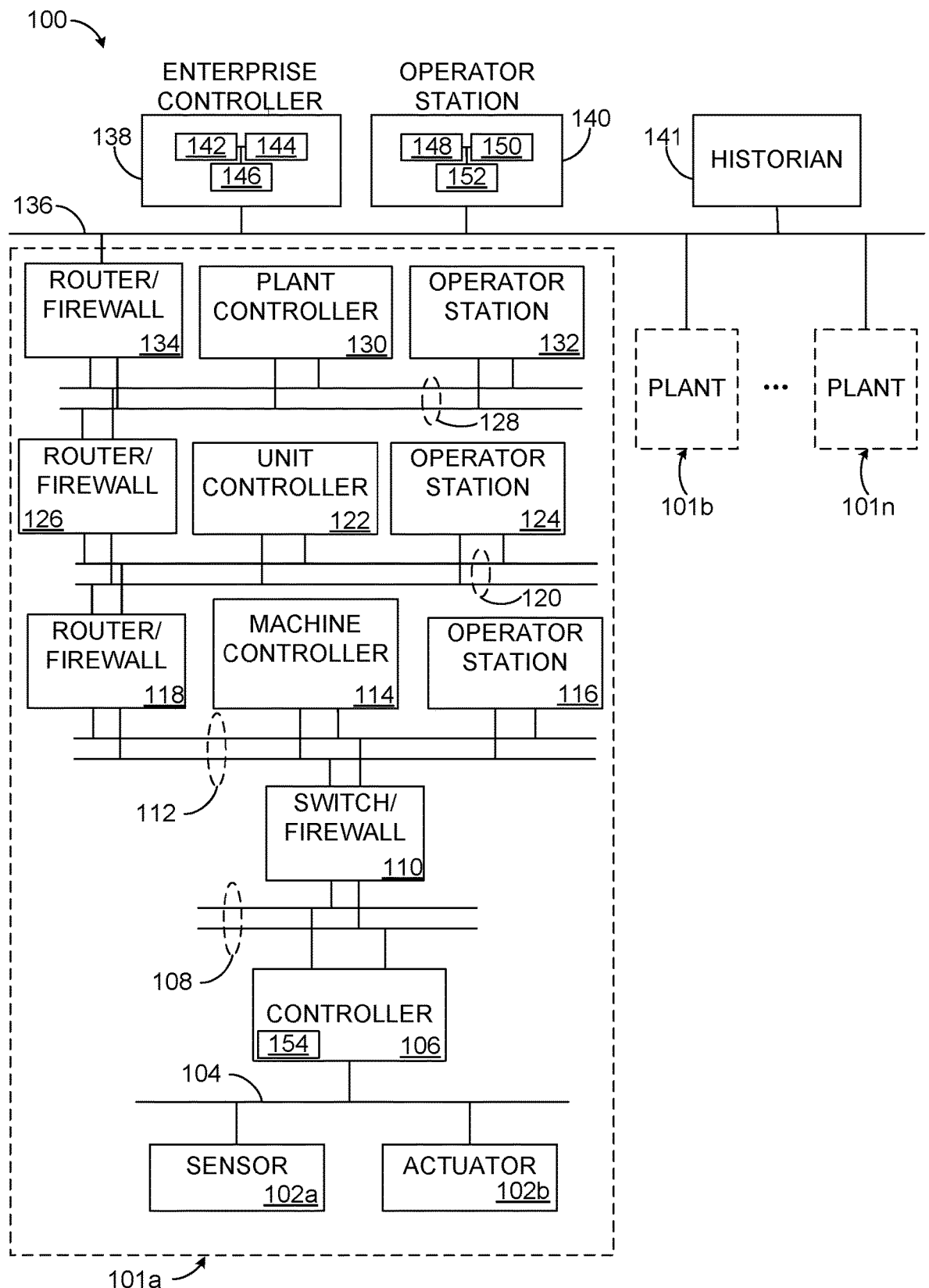
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers could include one or more processing devices 142 and one or more memories 144 for storing instructions and data used, generated, or collected by the processing device(s) 142. Each of the controllers could also include at least one network interface 146, such as one or more Ethernet interfaces or wireless transceivers. Also, each of the operator stations could include one or more processing devices 148 and one or more memories 150 for storing instructions and data used, generated, or collected by the processing device(s) 148. Each of the operator stations could also include at least one network interface 152, such as one or more Ethernet interfaces or wireless transceivers.

As noted above, various types of process controllers are used to interact with and control field devices. The process controllers often include or are used with input/output (I/O) modules, which are used to receive input signals from and provide output signals to the field devices. One popular hardware architecture for an I/O module uses a single microprocessor. However, it is often difficult or impossible to upgrade the firmware of an I/O module with a single-microprocessor architecture for a non-redundant process controller while maintaining view or control over the associated field devices.

In accordance with this disclosure, at least one controller in the system 100 (such as one or more of the controllers 106) includes or is used with one or more I/O modules 154 supporting on-process migration of non-redundant I/O firmware. As described in more detail below, each I/O module 154 may include a central processing unit (CPU) or other processing device, field circuitry, and a field controller. The field circuitry communicates with one or more field devices, and the processing device communicates with a process controller. The field controller denotes an independent processing entity within the I/O module 154 and is used to hold outputs of the I/O module 154 while the I/O module's processing device reboots into new firmware. The field circuitry of the I/O module 154 can therefore be controlled by both the processing device and the field controller of the I/O module 154.

During a firmware upgrade of the I/O module's processing device or during a reset of the I/O module's processing device after a firmware upgrade, the I/O module's processing device may be unable to send or receive signals. As a result, the I/O module's processing device may be unable to interact with the field circuitry of the I/O module 154. However, the field controller of the I/O module 154 continues communication with the field circuitry and can control the signal(s) output by the field circuitry. In this way, the field controller of the I/O module 154 could perform failsafe or other actions while providing the I/O module's processing device with time for a firmware upgrade. This enables the process controller to remain in an "on-process" state and avoid a shutdown of part or all of an industrial process dependent upon that process controller. Additional details regarding this on-process migration of I/O module firmware is provided below.

Although FIG. 1 illustrates one example of an industrial process control and automation system 100, various changes may be made to FIG. 1. For example, a control system could include any number of sensors, actuators, controllers, servers, operator stations, networks, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, process control and automation systems are highly configurable and can be configured in any suitable manner according to particular needs. In addition, while FIG. 1 illustrates one example environment in which on-process migration of non-redundant I/O firmware can be used, this functionality can be used in any other suitable device or system, and there is no requirement that the device or system be used for industrial process control.

Figure 2:
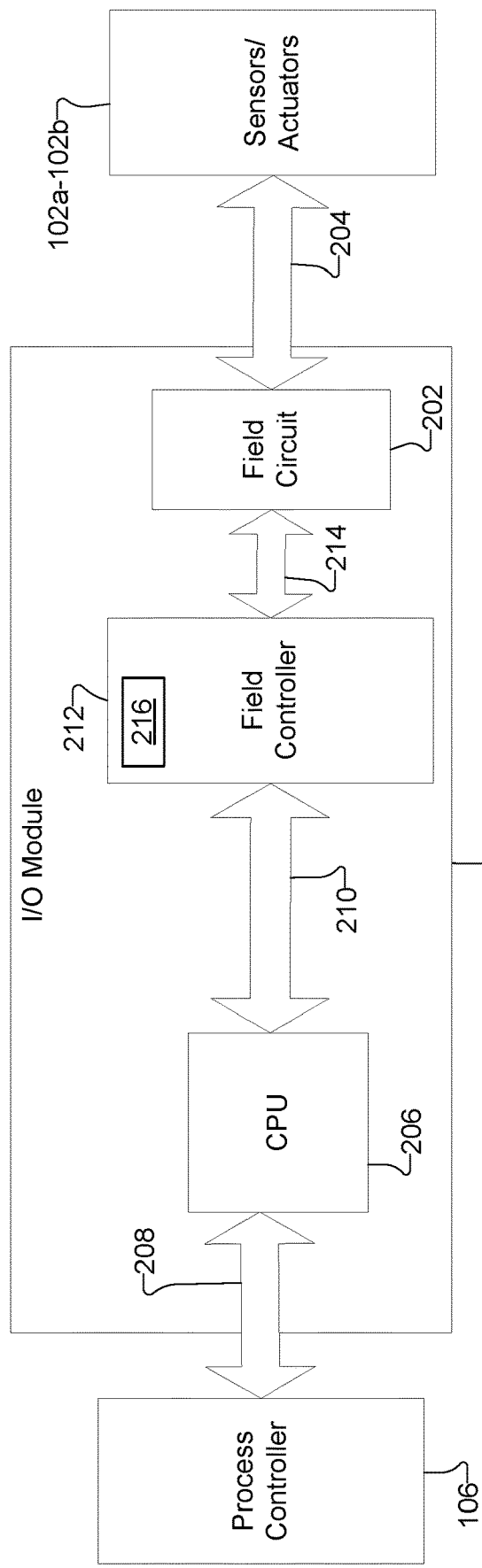
FIGS. 2 and 3 illustrate example I/O modules supporting on-process migration of non-redundant I/O firmware according to this disclosure.
Figure 3:
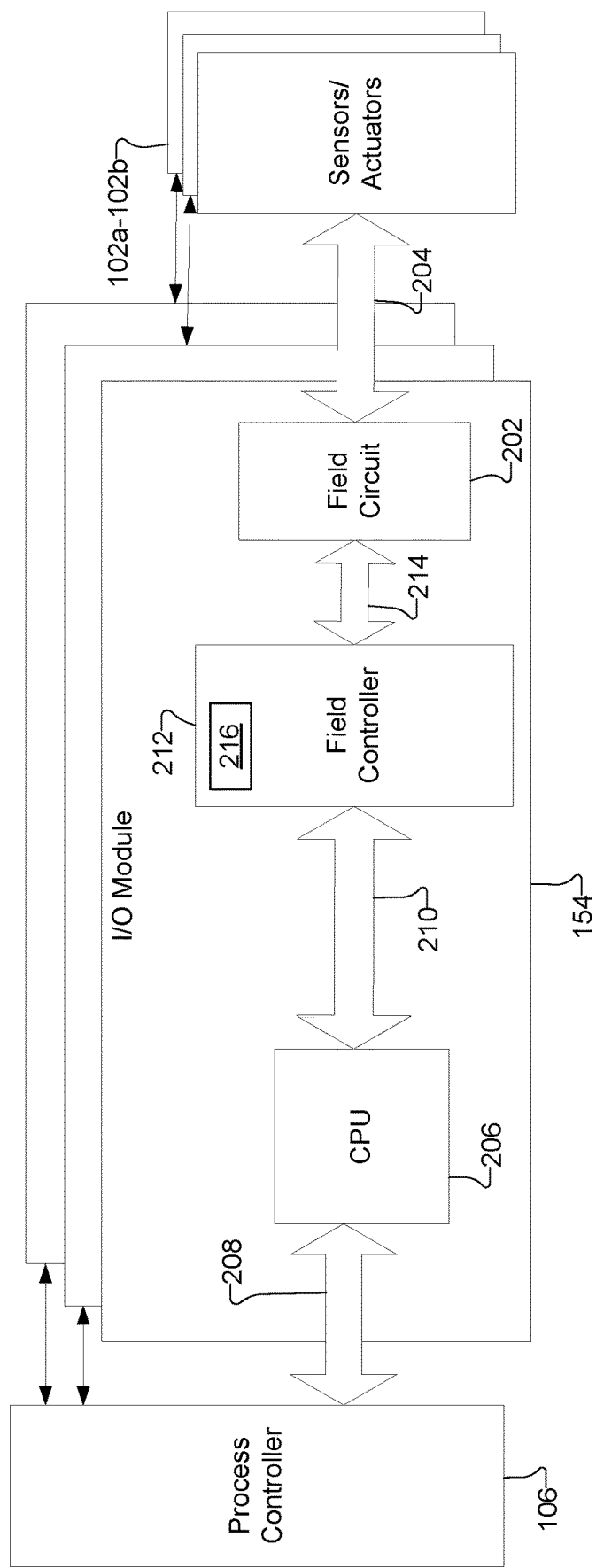

FIGS. 2 and 3 illustrate example I/O modules 154 supporting on-process migration of non-redundant I/O firmware according to this disclosure. For ease of explanation, the I/O modules 154 in FIGS. 2 and 3 are shown as being used with the field devices (sensors 102a and actuators 102b) and process controller 106 of FIG. 1. In particular embodiments, the process controller 106 could denote a non-redundant programmable logic controller (PLC), which is often used for automation of one or more industrial processes. However, the I/O modules 154 could be used with any other suitable devices and in any other suitable system. Also note that while the I/O modules 154 are shown here as residing outside of the process controller 106, the process controller 106 could also include one or more I/O modules 154.

As shown in FIG. 2, the I/O module 154 includes a field circuit 202, which communicates with and exchanges field signals 204 to and from one or more field devices. The field signals 204 could include input signals, such as sensor measurements from one or more sensors. The field signals 204 could also include output signals, such as control signals for one or more actuators. The field signals 204 can take various forms, such as analog input (AI) signals, analog output (AO) signals, digital input (DI) signals, and digital output (DI) signals. Depending on its implementation and use, the field circuit 202 could transmit or receive any number of input signals and/or any number of output signals.

The field circuit 202 includes circuitry that is used to send and receive the field signals 204. For example, the field circuit 202 could include circuitry for receiving AI or DI signals from the field device(s) and circuitry for transmitting AO or DO signals to the field device(s). Of course, any other or additional signals could be supported by the field circuit 202. In some embodiments, the circuitry used in the field circuit 202 can vary depending on the type(s) of signal(s) to be sent from or received by the field circuit 202, such as when the field circuit 202 includes dedicated circuitry for AI, AO, DI, and DO signals. In other embodiments, the field circuit 202 could include reconfigurable circuitry (such as universal I/O or "UIO" circuitry) that allows the same circuitry to be used to transmit or receive different types of signals. For instance, the same circuitry could be reconfigured to support AI, AO, DI, and DO signals. Example types of reconfigurable I/O circuits are shown in U.S. Pat. Nos. 8,072,098; 8,392,626; 8,656,065; and U.S. Patent Publication No. 2015/0278144 (all of which are hereby incorporated by reference in their entirety). I/O modules that support UNIVERSAL CHANNEL TECHNOLOGY from HONEYWELL INTERNATIONAL INC. are also suitable for use here.

The I/O module 154 also includes a CPU or other processing device 206. The processing device 206 supports the communication of data between the process controller 106 and the field devices. For example, the processing device 206 can receive signals from the process controller 106, perform any necessary processing on the signals, and provide the signals to the field circuit 202 for transport to the field devices. The processing device 206 can also receive signals from the field devices, perform any necessary processing on the signals, and provide the signals to the process controller 106. The processing device 206 can communicate over at least one communication interface 208 with the process controller 106 and over at least one communication interface 210 with the field circuit 202. In some embodiments, the communication interface 208 can be used to download new firmware to the processing device 206. The processing device 206 includes any suitable structure configured to operate in and control an I/O module, such as a microprocessor, microcontroller, field programmable gate array (FPGA), or application-specific integrated circuit (ASIC). Also, any suitable communication interfaces 208-210 could be used here.

The field circuit 202 is controlled by the processing device 206, so the field circuit 202 may not be autonomous and might not include any computer processing capabilities. Thus, in the absence of anything else, the field circuit 202 might not be able to perform any functions (such as driving outputs or sampling inputs) when the processing device 206 powers off, restarts, or is otherwise unable to send signals to or receive signals from the field circuit 202. Since the I/O module 154 can include a single processing device 206, any firmware upgrade of the processing device 206 could cause a complete loss in the ability to communicate with the field devices through the I/O module 154. Moreover, an on-process firmware upgrade process may require that the outputs of an I/O module go into a failsafe condition if the firmware fails to upgrade successfully (such as when the processing device fails to boot after a firmware download). Enforcing failsafe action during a boot failure in conventional single-microprocessor I/O modules may not be possible since there is no other element to control the field circuit.

To remedy this or other problems, the I/O module 154 partitions I/O control functionality into (i) functionality handled by the processing device 206 and (ii) functionality handled by a field controller 212. The field controller 212 is connected between the processing device 206 and the field circuit 202. The field controller 212 represents an independent processing entity within the I/O module 154 and can perform functions such as output hold or failsafe operations. For example, while the processing device 206 upgrades its firmware and reboots into the new firmware, the field controller 212 could drive the outputs to the actuators 102b through the field circuit 202, and the field controller 212 could receive and/or sample inputs from the sensors 102a. If the processing device 206 fails to boot successfully into the new firmware, the field controller 212 could drive suitable outputs to the field devices through the field circuit 202.

In this way, the processing device 206 is given time to perform a firmware upgrade and reboot, or other suitable actions can be taken if the processing device 206 fails to boot properly after a firmware upgrade. For example, the field controller 212 allows the I/O module 154 to reboot, prevents outputs of the field circuit 202 from being turned off while the processing device 206 reboots, and drives or holds the outputs of the field circuit 202 during the reboot and until the processing device 206 re-establishes its on-state (meaning it is successfully executing new firmware). Because of this, there may be little or no interruption to the control of an industrial process during the firmware upgrade. Moreover, this can be accomplished without requiring the use of redundant process controllers or I/O modules.

The field controller 212 includes any suitable processing device configured to perform some I/O functions related to an I/O module. For example, the field controller 212 could denote an FPGA or an ASIC. In some embodiments where an I/O module supports the use of universal I/O or UIO channels, the I/O module could include an FPGA, ASIC, or other device that is used to control the configuration of the I/O channels. In these embodiments, the FPGA, ASIC, or other device could be supplemented to perform the I/O functions of the field controller 212. This may allow the field controller 212 to be incorporated into I/O modules more easily and inexpensively.

The field controller 212 communicates with the processing device 206 over the communication interface 210 and communicates with the field circuit 202 over at least one communication interface 214. The communication interface 214 includes any suitable interface, such as a Serial Peripheral Interface (SPI) interface or a general purpose I/O (GPIO) interface.

During operation, the field controller 212 can drive the field circuit 202 to hold its outputs in certain states while the processing device 206 upgrades its firmware and reboots. The field controller 212 could also include a failsafe timer 216, which can be used to detect when a specified period of time has elapsed during a firmware upgrade. The failsafe timer 216 allows the field controller 212 to detect whether the processing device 206 has successfully rebooted within the specified period of time and to perform the same or additional failsafe operations if not.

As shown in FIG. 3, multiple I/O modules 154 could also be used with the same process controller 106. In some embodiments, each of the I/O modules 154 shown in FIG. 3 could have the same or similar structure. In other embodiments, different I/O modules 154 shown in FIG. 3 could have different structures. For example, different I/O modules 154 could have field circuits 202 defining different types of inputs or outputs. As another example, not all of the I/O modules 154 may require the use of the field controller 212.

Although FIGS. 2 and 3 illustrate examples of I/O modules 154 supporting on-process migration of non-redundant I/O firmware, various changes may be made to FIGS. 2 and 3. For example, each component shown in FIGS. 2 and 3 could be implemented any suitable hardware or combination of hardware and software/firmware instructions. Also, various components could be rearranged as needed or desired, such as when one or more components of the I/O module 154 are placed within the process controller 106. In addition, while shown as being used with sensors, actuators, and process controllers, the I/O modules 154 could be used with any other suitable external devices.

Figure 4:
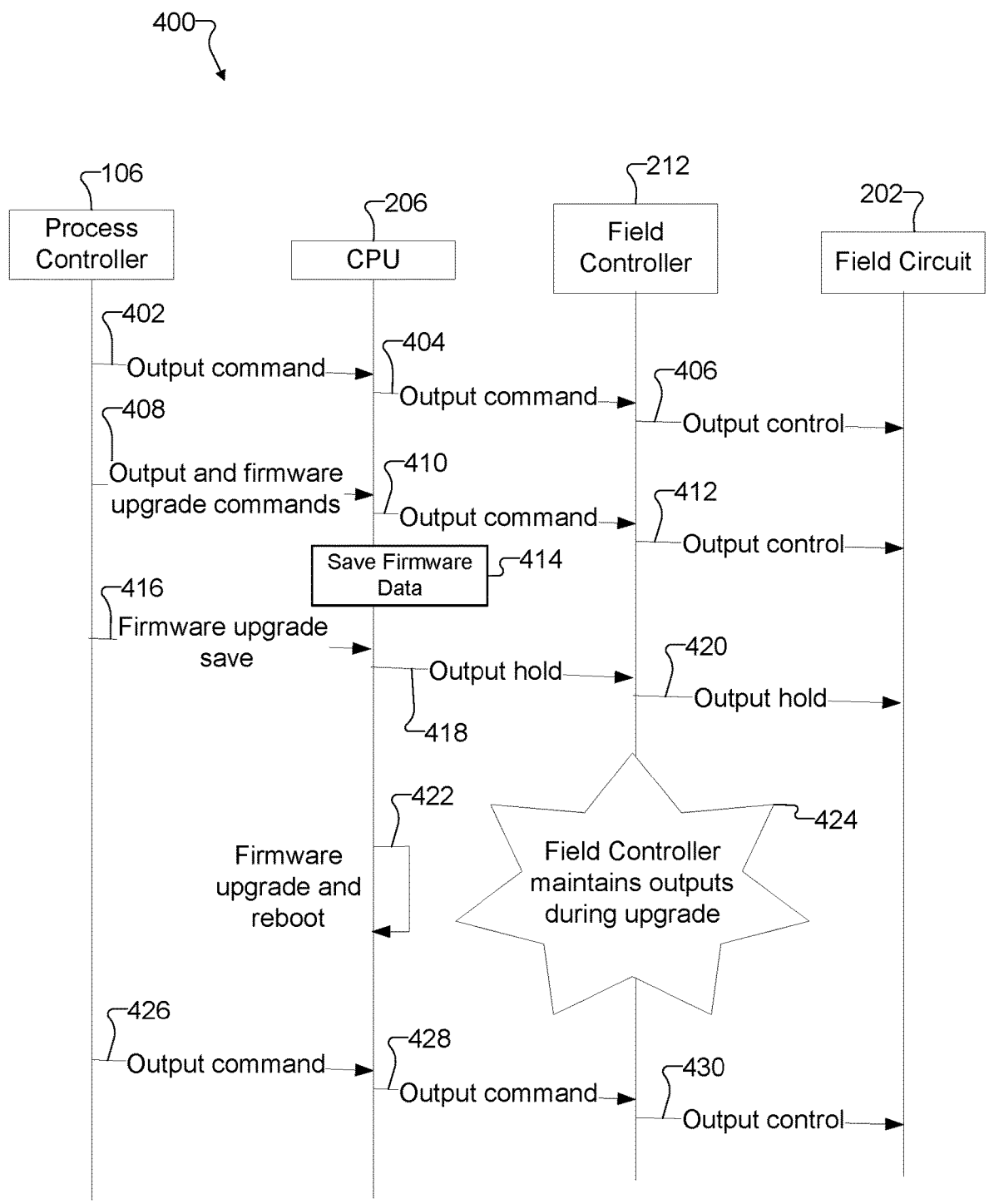
FIG. 4 illustrates an example process during a successful firmware upgrade in a non-redundant process controller according to this disclosure.

FIG. 4 illustrates an example process 400 during a successful firmware upgrade in a non-redundant process controller according to this disclosure. For ease of explanation, the process 400 is described as being implemented using the I/O module 154 of FIGS. 2 and 3 with a process controller 106 in the system 100 of FIG. 1. However, the process 400 could be used with any other suitable devices and in any other suitable system.

As shown in FIG. 4, prior to the start of a firmware upgrade, the process controller 106 is operating to control an industrial process. During this time, the process controller 106 (periodically or at other times) sends an output command 402 to the I/O module 154. The processing device 206 of the I/O module 154 sends a corresponding output command 404 to the field controller 212, which sends an output control signal 406 to the field circuit 202 for delivery to one or more field devices. This could occur any number of times during the course of any length of time.

At some point, the I/O module 154 receives one or more firmware upgrade commands 408 (possibly with one or more output commands) from the process controller 106, and the processing device 206 of the I/O module 154 enters a firmware upgrade mode in response. In this example, the firmware upgrade mode includes two phases, namely download of new firmware followed by resetting of the processing device 206 into the newly-downloaded firmware. During the first phase, the processing device 206 can continue receiving output commands from the process controller 106, and the processing device 206 and the field controller 212 can continue sending output commands 410 and output control signals 412, respectively, according to the old firmware of the I/O module 154.

The firmware upgrade commands 408 can include new firmware data, which is saved 414 by the processing device 206. The saving of the new firmware data could occur at any suitable time. The new firmware can be extracted from the firmware upgrade commands 408 and stored, such as in an internal memory of the processing device 206 or in another memory of the I/O module 154. Optionally, the processing device 206 may send an indication to the process controller 106 confirming whether the firmware data was successfully saved. Again, note that the I/O module 154 still functions using the old firmware during this time.

The process controller 106 eventually sends a firmware upgrade save command 416 to the I/O module 154. In some embodiments, the process controller 106 sends the firmware upgrade save command 416 in response to receiving an indication from the processing device 206 confirming that the new firmware data was successfully saved at the I/O module 154. The firmware upgrade save command 416 causes the processing device 206 to reset and upgrade its firmware.

The processing device 206, in response to receiving the firmware upgrade save command 416, sends an output hold command 418 to the field controller 212, and the field controller 212 sends held output control signals 420 to the field circuit 202. The processing device 206 performs a firmware upgrade process 422 to upgrade to the new firmware and attempts to reboot. In some embodiments, the processing device 206 starts the firmware upgrade process 422 as soon as the output hold command 418 is sent. In particular embodiments, the firmware upgrade process 422 includes writing the new firmware to a Flash memory or other memory of the processing device 206. The output hold command 418 causes the field controller 212 to enter a mode 424 in which the field controller 212 stops updating output control commands and holds (continue applying) the last received output control command. The field controller 212 can maintain the held outputs for a period of time, such as the period during which the processing device 206 reboots into the newly-downloaded firmware. Although not shown (since the firmware upgrade is successful here), the failsafe timer 216 of the field controller 212 could be used to verify whether the processing device 206 reboots successfully within a desired time period.

Once the processing device 206 successfully reboots into the newly-downloaded firmware, the process controller 106 sends additional output commands 426 to the I/O module 154. In response, the processing device 206 sends corresponding output commands 428 to the field controller 212, which stops holding its outputs and sends new output control signals 430 to the field circuit 202. In some embodiments, the process controller 106 could wait for a period of time (such as the expected period during which the processing device 206 reboots into the newly-downloaded firmware) before sending the additional output commands 426. In other embodiments, the process controller 106 could ping or otherwise query the I/O module 154 to see if the processing device 206 has rebooted successfully before sending the additional output commands 426. The functions performed by the I/O module 154 during this period occur using the new firmware.

Figure 5:
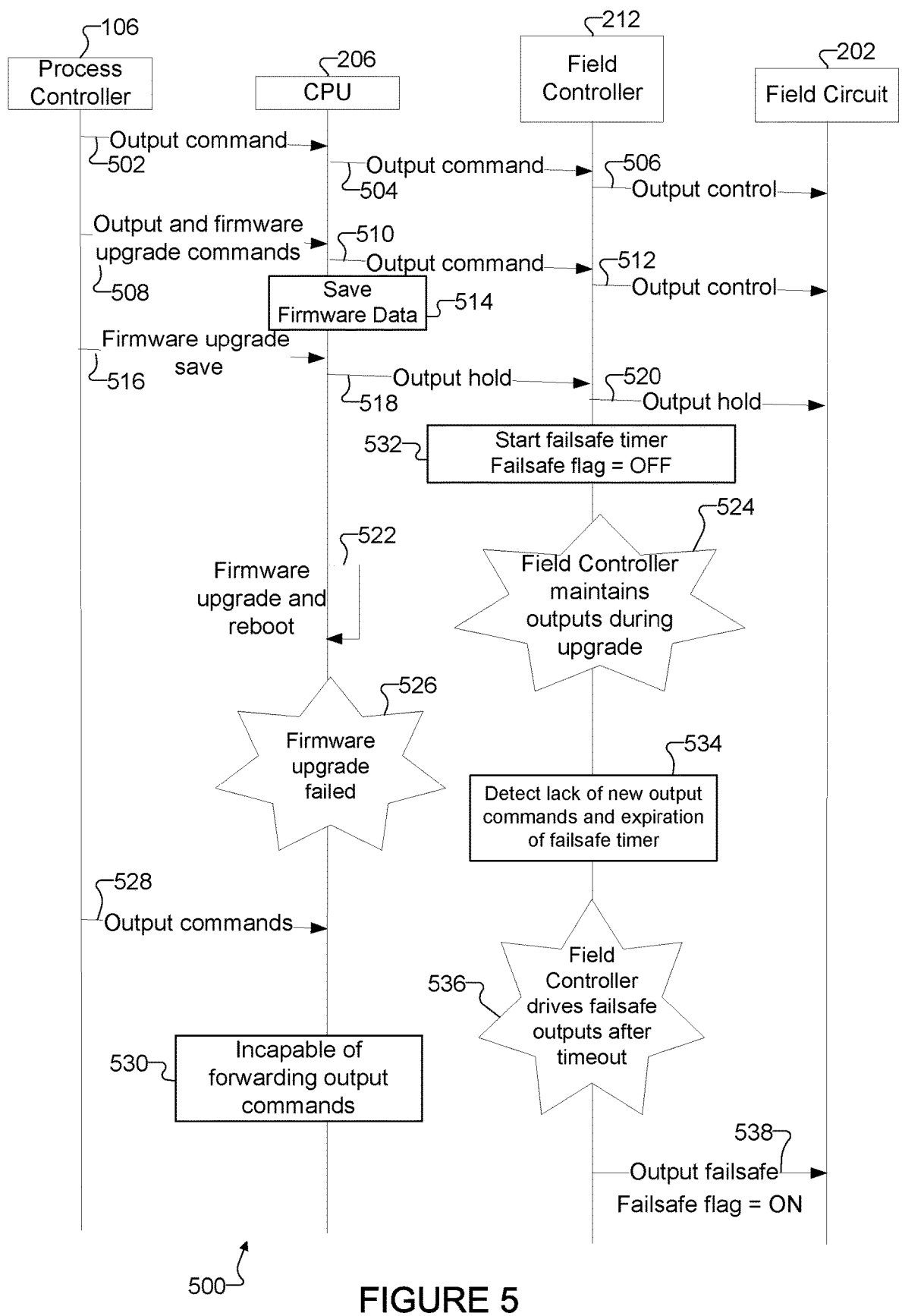
FIG. 5 illustrates an example process during a failed firmware upgrade in a non-redundant process controller according to this disclosure.

FIG. 5 illustrates an example process 500 during a failed firmware upgrade in a non-redundant process controller according to this disclosure. For ease of explanation, the process 500 is described as being implemented using the I/O module 154 of FIGS. 2 and 3 with a process controller 106 in the system 100 of FIG. 1. However, the process 500 could be used with any other suitable devices and in any other suitable system.

In FIG. 5, operations 502-524 may occur in the same or similar manner as the corresponding operations 402-424 in FIG. 4, except the firmware upgrade process 522 in FIG. 5 is not successful. This could occur for any number of reasons, such as an inability to properly store the new firmware in a memory of the processing device 206 or an inability of the processing device 206 to reboot successfully. As a result, the firmware upgrade fails 526, and the additional output commands 528 from the process controller 106 cannot be forwarded 530 by the processing device 206.

As shown in FIG. 5, at some point 532 (such as in response to receiving the output hold command 518 and prior to the upgrade process 522), the field controller 212 starts the failsafe timer 216 and sets a failsafe flag to an OFF value. As noted above, these same operations could occur in FIG. 4 but are omitted for clarity since FIG. 4 shows a successful firmware upgrade. The failsafe timer 216 can be configured to timeout upon expiration of a specified period of time, such as the expected period during which the processing device 206 would reboot into the newly-downloaded firmware.

The field controller 212 then waits and detects 534 that no new output commands are received from the processing device 206 prior to the timeout of the failsafe timer 216. The field controller 212 can therefore determine that the firmware upgrade has not been successful. As a result, the field controller 212 determines 536 that it needs to set the failsafe flag to an ON value and drive failsafe output control signals 538 through the field circuit 202. When the field controller 212 outputs failsafe control signals 538, this causes the field devices to enter a state that will not endanger lives or property. The exact failsafe configuration of the field controller 212 could be controlled in any suitable manner, such as by having the processing device 206 program the failsafe configuration and the failsafe timeout into the field controller 212. Note that the field controller 212 may remain in the failsafe mode until that mode is overridden by a user or higher-level device.

Although FIGS. 4 and 5 illustrate examples of processes 400 and 500 during successful and unsuccessful firmware upgrades in a non-redundant process controller, various changes may be made to FIGS. 4 and 5. For example, while shown as a series of steps, various steps in each figure could overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed:

1. A method comprising:
   receiving, at a first processing device of an input/output module (IOM) configured as a non-redundant unit from a process controller of a process control and automation system, new firmware data for the IOM;
   sending an output hold command from the first processing device to a second processing device of the IOM;
   upgrading firmware of the IOM with the new firmware data using the first processing device and attempting a reboot of the first processing device;
   in response to the output hold command and during the upgrading of the firmware and the rebooting of the first processing device, using the second processing device to cause a field circuit of the IOM to hold at least one previous output signal for one or more external devices; and
   in response to not receiving a new command from the first processing device at the second processing device after causing the field circuit to hold the at least one previous output signal, using the second processing device to cause the field circuit to output at least one failsafe output signal for the one or more external devices,
   wherein the IOM and the process controller are separate devices.

2. The method of claim 1, further comprising:
   in response to receiving a new command from the first processing device at the second processing device after causing the field circuit to hold the at least one previous output signal, using the second processing device to cause the field circuit to output at least one new output signal for the one or more external devices.

3. The method of claim 1, further comprising:
   starting a timer in response to receipt of the output hold command, the timer creating a timeout when a specified period of time elapses; and
   determining whether a new command from the first processing device is received at the second processing device during the specified period of time.

4. The method of claim 3, wherein:
   the at least one previous output signal is held and output during the specified period of time and before the timeout; and
   the at least one failsafe output signal is output after the timeout.

5. The method of claim 1, wherein generating the output hold command comprises generating the output hold command in response to receiving a firmware upgrade save command at the first processing device.

6. The method of claim 1, further comprising:
   automatically initiating a firmware upgrade process using the first processing device upon outputting the output hold command to the second processing device.

7. An apparatus configured for use with a first processing device of an input/output module (IOM), the apparatus comprising:
   a second processing device configured to:
      receive an output hold command from the first processing device after the first processing device receives new firmware data for the IOM from a process controller of a process control and automation system;
      in response to the output hold command and during an upgrade of firmware in the IOM by the first processing device and during rebooting of the first processing device, cause a field circuit of the IOM to hold at least one previous output signal for one or more external devices; and
      in response to not receiving a new command from the first processing device after causing the field circuit to hold the at least one previous output signal, cause the field circuit to output at least one failsafe output signal for the one or more external devices,
   wherein the second processing device is part of the IOM, and the IOM and the process controller are separate devices, and wherein the IOM is configured as a non-redundant unit.

8. The apparatus of claim 7, wherein the second processing device is further configured, in response to receiving a new command from the first processing device after causing the field circuit to hold the at least one previous output signal, to cause the field circuit to output at least one new output signal for the one or more external devices.

9. The apparatus of claim 7, wherein the second processing device is further configured to:
   start a timer in response to receipt of the output hold command, the timer configured to create a timeout when a specified period of time elapses; and
   determine whether a new command from the first processing device is received during the specified period of time.

10. The apparatus of claim 9, wherein the second processing device is configured to:

cause the field circuit to hold and output the at least one previous output signal during the specified period of time and before the timeout; and cause the field circuit to output the at least one failsafe output signal after the timeout.

11. A system comprising:

an input/output module (IOM) configured as a non-redundant unit comprising a first processing device, a second processing device, and a field circuit;

wherein the field circuit is configured to at least one of: receive one or more input signals and provide one or more output signals;

wherein the first processing device is configured to receive, from a process controller of a process control and automation system, new firmware data for the IOM, send an output hold command to the second processing device, upgrade firmware of the IOM with the new firmware data, and attempt a reboot;

wherein the second processing device is configured, in response to the output hold command and during the upgrading of the firmware and the rebooting of the first processing device, to cause the field circuit to hold at least one previous output signal for at least one external device;

wherein the second processing device is further configured, in response to not receiving a new command from the first processing device after causing the field circuit to hold the at least one previous output signal, to cause the field circuit to output at least one failsafe output signal for the at least one external device; and wherein the IOM and the process controller are separate devices.

12. The system of claim 11, wherein the second processing device is further configured, in response to receiving a new command from the first processing device after causing the field circuit to hold the at least one previous output signal, to cause the field circuit to output at least one new output signal for the one or more external devices.

13. The system of claim 11, wherein the second processing device is further configured to:

start a timer in response to receipt of the output hold command, the timer configured to create a timeout when a specified period of time elapses; and determine whether a new command from the first processing device is received during the specified period of time.

14. The system of claim 13, wherein the second processing device is configured to:

cause the field circuit to hold and output the at least one previous output signal during the specified period of time and before the timeout; and cause the field circuit to output the at least one failsafe output signal after the timeout.

15. The system of claim 11, wherein the first processing device is configured to generate the output hold command in response to receiving a firmware upgrade save command.

16. The system of claim 11, wherein the first processing device is configured to automatically initiate a firmware upgrade process upon outputting the output hold command to the second processing device.

17. The system of claim 11, further comprising:

a communication interface communicatively coupling the first processing device and the second processing device.

18. A non-transitory computer readable medium containing instructions for use in conjunction with a first processing device of an input/output module (IOM) configured as a non-redundant unit, the instructions when executed by a second processing device of the IOM configured to cause the second processing device to:

receive an output hold command from the first processing device after the first processing device receives new firmware data for the IOM from a process controller of a process control and automation system; early in response to the output hold command and during an upgrade of firmware in the IOM by the first processing device and during rebooting of the first processing device, cause a field circuit of the IOM to hold at least one previous output signal for one or more external devices; and in response to not receiving a new command from the first processing device after causing the field circuit to hold the at least one previous output signal, cause the field circuit to output at least one failsafe output signal for the one or more external devices, wherein the second processing device is part of the IOM, and the IOM and the process controller are separate devices.

19. The non-transitory computer readable medium of claim 18, wherein the instructions further cause the second processing device to:

in response to receiving a new command from the first processing device after causing the field circuit to hold the at least one previous output signal, to cause the field circuit to output at least one new output signal for the one or more external devices.

20. The non-transitory computer readable medium of claim 18, wherein the instructions further cause the second processing device to:

start a timer in response to receipt of the output hold command, the timer configured to create a timeout when a specified period of time elapses; and determine whether a new command from the first processing device is received during the specified period of time.

21. The non-transitory computer readable medium of claim 20, wherein the instructions further cause the second processing device to:

cause the field circuit to hold and output the at least one previous output signal during the specified period of time and before the timeout; and cause the field circuit to output the at least one failsafe output signal after the timeout.

* * * * *